April 5, 1960
E. F. JANKOWSKI
2,931,414
VEHICLE TIRE INFLATING SYSTEM
Filed June 27, 1956
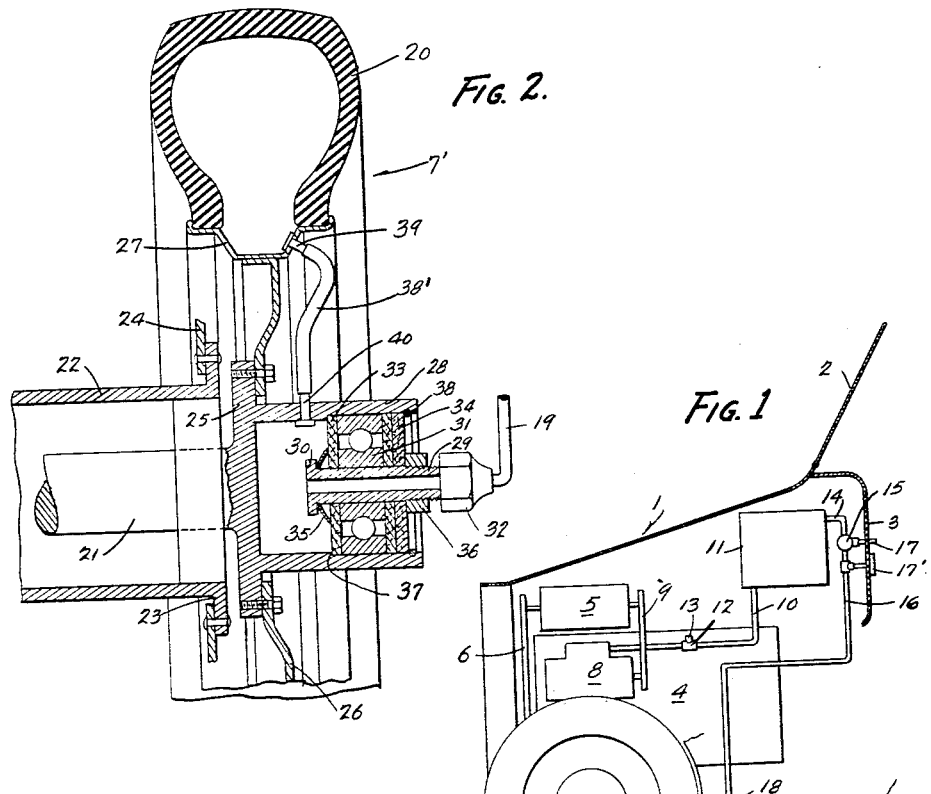
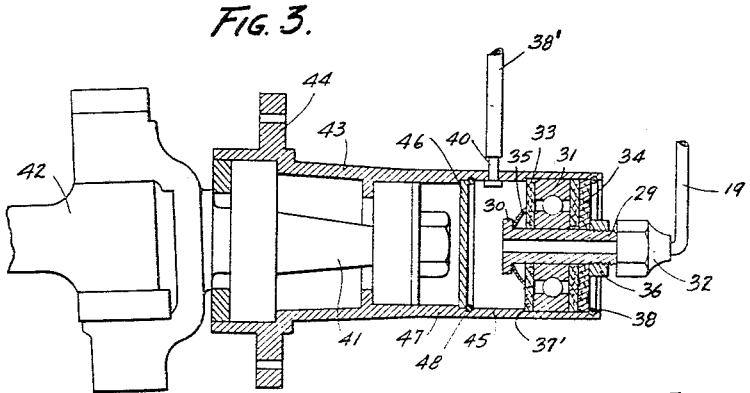
INVENTOR.
EDWIN F. JANKOWSKI
BY
Beau, Brooks, Buckley & Beau.
ATTORNEYS United States Patent Office 2,931,414
Patented Apr. 5, 1960

2,931,414

VEHICLE TIRE INFLATING SYSTEM

Edwin F. Jankowski, Java, N.Y.

Application June 27, 1956, Serial No. 594,299

1 Claim. (Cl. 152—417)

This invention relates generally to the vehicle tire inflating art, and more particularly to a self contained vehicle tire inflating system having a new and useful coupling arrangement.

Various self contained vehicle tire inflating systems, wherein the vehicle is equipped with means for compressing air and for transmitting the compressed air to individual pneumatic tires for selectively and/or automatically inflating the same, have been proposed. However, such systems have not been adopted on a commercial scale and I believe that one reason for their lack of success in this respect lies in their failure to provide a satisfactory, practical solution to the problem of coupling the compressed air supply conduits to the rotating wheels.

This problem arises because the compressed air supply is fixed relative to the rotating wheels, and coupling means must be provided having one part rotating with the wheel relative to another part. Various arrangements have been proposed to accomplish this but they either require drilling or boring passages through the rear axle and/or the front wheel spindles, which is relatively costly, difficult to do accurately, and presents the likelihood of the small passages becoming clogged, or use relatively delicate fittings and other parts which are difficult to position with the requisite accuracy, or are otherwise unsatisfactory.

Accordingly, it is a primary object of my invention to provide a practical coupling arrangement for transmitting pneumatic pressure fluid from the relatively fixed supply system to the rotating tires.

Another object of my invention is to provide a vehicle tire inflating system coupling comprising relatively few parts which are rugged and durable and which are relatively inexpensively fabricated and readily assembled and installed.

A vehicle tire inflating system coupling arrangement in accord with my invention is characterized by the provision of a first hollow shaft part formed to comprise an extension of the axle means mounting the wheel for rotation, whether it be the rear axle or the front wheel spindle, the first shaft part being concentric with the axis of rotation of the wheel, and a second hollow shaft part aligned with the axis of rotation and extending into the first shaft part in spaced relation to the inner end thereof, which is outwardly of the axle means, whereby a pressure chamber is provided between the second shaft part and the inner end of the first shaft part, bearing means supporting the first shaft part for rotation about the second shaft part, means including a relatively fixed conduit extending from the source of air under pressure to the second shaft part for supplying the pressure chamber with pneumatic fluid under pressure, and means including a second conduit communicating with the pressure chamber through the side wall thereof and placing the same in communication with the tire.

The foregoing and other objects, advantages and characterizing features of a vehicle tire inflating system in accord with my invention will become clearly apparent from the ensuing detailed description of the presently preferred embodiments thereof for the front and rear wheels of a vehicle, taken together with the accompanying drawing comprising a part of this description and illustrating such embodiments wherein:

Fig. 1 is a fragmentary, generally diagrammatic view showing the tire inflating system of this invention installed in a vehicle;

Fig. 2 is a fragmentary, sectional detail view of the rear wheel coupling arrangement of this invention; and Fig. 3 is a fragmentary sectional detail view of the front wheel coupling arrangement of this invention.

Referring now to the accompanying drawing, the tire inflating system of my invention is shown installed on a vehicle 1 of conventional design having a windshield 2 and an instrument panel board 3 therebeneath. Vehicle 1 also has the usual motor 4 and generator 5 driven thereby through a transmission belt 6. Vehicle 1 has front and rear wheels indicated at 7 and 7', respectively, and in accord with my invention means are provided for selectively and/or automatically inflating and maintaining the desired pressure in the pneumatic tire on each wheel as follows.

A compressor 8 of known design is mounted in the vehicle motor compartment in any convenient manner, and is driven by the motor 4 as for example from the shaft of generator 5 through a drive belt 9. Compressor 8 has an air intake, not illustrated, and is adapted to compress pneumatic fluid, such as atmospheric air. A conduit 10 places a reservoir 11, also preferably positioned within the vehicle motor compartment, in communication with the output of compressor 8, whereby upon running the vehicle motor 4 air under pressure is supplied to the reservoir 11 from compressor 8 and a supply of pneumatic fluid under predetermined pressure is thereby maintained in reservoir 11. A check valve 12 can be provided in conduit 10 to prevent back flow of air upon stopping motor 4 and can include a pressure relief valve 13 to avoid excessive pressure build up in reservoir 11.

While compressor 8 and reservoir 11 are shown positioned in the vehicle motor compartment, they can be located elsewhere on the vehicle without departing from my invention, and compressor 8 can be driven by other means.

A conduit 14 places a divider or manifold 15 in communication with reservoir 11, and four conduits 16, one for each wheel and each having a known type of control valve 17 therefor and a conventional pressure indicating device 17' associated therewith, lead from manifold 15. The arrangement thereof being the same for each wheel insofar as my present invention is concerned, only the arrangement for one wheel is illustrated and described herein. Control valves 17 extend through instrument panel board 3 and are accessible to the vehicle operator for selectively controlling the admission of pressure fluid from manifold 15 through the conduits 16 to and through means such as flexible joints 18 carried for example by the fender or other body part of the vehicle and connected to conduits 19 leading therefrom to the couplings of this invention at the individual wheels 7 and 7'. The devices 17' continuously indicate the pressure in the tire on each wheel.

In accord with my invention, the pneumatic pressure fluid is transmitted from the conduits 19 to the individual tires such as shown at 20 through a coupling utilizing a pair of hollow shafts concentrically related to each other and to the axis of rotation of the wheel, one rotating with the wheel about the other which is positionally fixed relative thereto in communication with the associated conduit 19. Thus, each rear wheel 7' (Fig. 2)

has the usual rear axle 21 enclosed within a housing 22 having a flange 23 carrying a brake drum indicated at 24, the axle proper terminating in a flange 25 carrying a wheel hub 26 which in turn mounts a rim 27 supporting a pneumatic tire 20. Whereas normally axle 21 ends at or closely adjacent the flange 25, being covered by a hub cap as is well known in the art, in accord with my invention axle 21 is provided with an extension, preferably integral therewith, in the form of a first hollow shaft part 28 concentric with the axis of rotation of the wheel as defined by the axle 21, and extending outwardly therefrom. A second hollow shaft part 29 is aligned with the axis of rotation of the wheel and projects into the first shaft part 28, thereby being concentrically related thereto, having a flanged end 30 spaced from the inner end of shaft part 28 which is the outer end of axle 21. Shaft parts 28 and 29 are supported by a bearing structure 31 fitted therebetween and mounting the axle carried shaft part 28 for rotation about the second shaft part 29, whereby there is defined between the bearing structure 31, shaft part 29, shaft part 28 and the inner end thereof a generally cylindrical pressure chamber.

Pressure fluid is supplied to the pressure chamber within shaft part 28 through the second shaft part 29 from the associated conduit 19 which is coupled to the shaft part 29 as by the member 32 threaded thereon. Sealing members 33 and 34 extend between the shaft parts 28 and 29 on opposite sides of bearing structure 31, to seal the pressure chamber, and the various parts are held in tight engagement as by a dished spring 35 extending between the end flange 30 of shaft 29 and the inner sealing member 33, and a nut or like clamping member 36 threaded on the outer end of shaft part 29 and bearing against the outer sealing member 34. The entire bearing and sealing unit is held in place as by a shoulder 37 formed in the inner wall of shaft part 28 and a split O-ring 38 engaged in a groove on the inner wall of shaft part 28 for holding the unit against shoulder 37.

Pressure fluid is supplied to the interior of the tire 20 from the pressure chamber through a conduit 38' which is secured at one end as to the usual valve 39 extending through the rim 27 for communication with the tire, and at its other end to a fitting 40 extending through the wall of shaft part 28 into the pressure chamber between the opposite ends thereof. The valve 39 will be held open, or a normally open fitting can be used in place thereof.

In the case of the front wheels which have a conventional spindle 41 extending from a steering knuckle 42 and surrounded by a housing 43 including a flange 44 to which the wheel hub 26 is secured, the spindle housing is extended outwardly as indicated at 45 and such extension comprises a first hollow shaft part arranged in concentric relation with the axis of rotation of the wheel as defined by the spindle. The second shaft part 29 and the bearing 31 and sealing arrangement remain the same as shown in Fig. 2 and described in connection with the rear wheels, whereby a pressure chamber is provided within the hollow shaft part 45 which can have its inner end defined by a plate 46 spaced from the outer end of spindle 41 and held against a shoulder 47 as by a split O-ring 48.

Thus, it will be seen that a tire inflating coupling arrangement constructed in accord with my invention fully accomplishes the aforesaid objects. Because it uses actual shafting of hollow form, instead of delicate fittings and like parts, the same is very rugged and durable while being relatively easily and inexpensively fabricated. Also, the positioning of the fixed member, which must be quite exact, is greatly facilitated by the arrangement of this invention with its bearing structure carried within the outer shaft part, which is concentric with the axis of rotation, whereby the fixed, second shaft part 29 is automatically aligned with the axis of rotation.

It will be appreciated that my tire inflating system can be arranged for selective inflation of the tires under the control of valve members 17, or for automatically maintaining the tires at a predetermined desire pressure, and if desired pressure relief valves 50 can be provided at the tires in the same manner as the air valves 39.

While only the presently preferred forms of my invention for the front and rear wheels have been disclosed in detail herein, it will be appreciated that my invention is not necessarily limited to the details thereof but includes modifications and variations falling within the scope of the appended claim. In this regard, it will be appreciated that the term "axle means" as used in the appended claim refers to the front wheel spindle 41 and its housing 43, as well as to the rear axle 21.

Having fully disclosed and completely described my invention, together with its mode of operation, what I claim as new is:

In a pneumatic pressure control system for wheeled vehicles having means for supplying pneumatic fluid under pressure, a wheel carrying a pneumatic tire, and means including axle means mounting said wheel for rotation about an axis, internally shouldered first hollow shaft means extending beyond the outer end of said axle means in concentric relation to said axis, second hollow shaft means aligned with said axis and extending into said first shaft means a distance short of the outer end of said axle means, roller bearing means supporting said second shaft means in said first shaft means for rotation of the latter about the former, said first and second shaft means defining a pressure chamber at the outer end of said axle means and said bearing means substantially defining the outer end of said chamber, pressure chamber sealing means between said first and second shaft means in pressure sealing relation thereto on opposite sides of said bearing means, means carried by said second shaft means adjacent the inner and outer ends thereof securing said bearing means and said sealing means together and to said second shaft means as a unit, retainer means locking said bearing and sealing means in said first shaft means against the internal shoulder thereof, means including first pressure fluid supply conduit means placing said second shaft means in communication with said pressure fluid supply means for admitting pressure fluid to said chamber, and means including second pressure fluid supply conduit means communicating with said chamber through said first shaft means between the opposite ends of said chamber and with said tire for supplying pressure fluid thereto from said chamber, wherein said means securing said bearing means and said sealing means together and to said second shaft means as a unit comprise, flange means at the inner end of said second shaft means, spring means carried by said second shaft means between said flange means and the pressure sealing means on the inner side of said bearing means, and a clamping member carried by said second shaft means and bearing against the pressure sealing means on the outer side of said bearing means.

References Cited in the file of this patent

UNITED STATES PATENTS

| | | |
|---|---|---|
| 1,016,896 | Rivers | Feb. 6, 1912 |
| 1,040,643 | Darnley | Oct. 8, 1912 |
| 1,205,504 | Bearce | Nov. 21, 1916 |
| 1,662,601 | Demchuk | Mar. 11, 1928 |
| 1,722,489 | Bott | July 30, 1929 |
| 1,772,963 | Schmidt | Aug. 12, 1930 |
| 2,253,932 | Gilkerson | Aug. 26, 1941 |
| 2,270,928 | Browne | Jan. 27, 1942 |
| 2,305,725 | Meyer | Dec. 22, 1942 |
| 2,622,946 | McKissick et al. | Dec. 30, 1952 |